(12) United States Patent
Takemura et al.

(10) Patent No.: US 6,246,859 B1
(45) Date of Patent: Jun. 12, 2001

(54) ORIGINAL SENSING DEVICE AND SENSING DEVICE

(75) Inventors: Yukio Takemura; Michitaka Setani, both of Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/352,876

(22) Filed: Jul. 13, 1999

(30) Foreign Application Priority Data

Jul. 13, 1998 (JP) .................................................. 10-213471
Apr. 26, 1999 (JP) .................................................. 11-118610

(51) Int. Cl.[7] .................................................. G03G 15/00
(52) U.S. Cl. ..................... 399/371; 250/227.11; 250/239
(58) Field of Search .................................... 399/370, 371, 399/376, 218; 356/225; 250/559.07, 559.06, 559.05, 237 R, 239, 227.2, 227.26, 227.11; 358/484; 271/153, 3.17

(56) References Cited

U.S. PATENT DOCUMENTS

| | | | |
|---|---|---|---|
| 4,249,082 | * 2/1981 | Kakigi et al. | 250/574 |
| 4,833,336 | * 5/1989 | Kraske | 250/566 |
| 5,696,607 | * 12/1997 | Yamana et al. | 358/474 |
| 5,783,820 | * 7/1998 | Takami | 250/239 |
| 5,786,890 | * 7/1998 | Noh | 356/225 |
| 5,945,664 | * 8/1999 | Ogura | 250/208.1 |

* cited by examiner

Primary Examiner—Robert Beatty
(74) Attorney, Agent, or Firm—Fitzpatrick, Cella, Harper & Scinto

(57) ABSTRACT

An original sensing device for sensing the presence/absence of an original placed on an original tray of a document feeder by using an output signal from a photodetector which receives a light beam emitted by a light projector and reflected by the original tray, including a projecting/photodetecting unit including the light projector and the photodetector, and an optical member interposed between the projecting/photodetecting unit and the original tray. The light projector and the photodetector are arranged to oppose said original tray such that a projecting optical axis and a photodetecting optical axis are substantially parallel to each other. Boundary surfaces of the optical member are constructed such that a portion of a light beam on the projecting optical axis emerges toward a direction of said original tray via at least two boundary surfaces, a reflected light beam from the original tray is guided to said photodetector via at least two boundary surfaces, and other part of the light beam on the projecting optical axis does not emerge toward the direction of said original tray but is reflected by a boundary surface facing the original tray and is totally reflected by a boundary surface facing the photodetector.

72 Claims, 8 Drawing Sheets

TOTAL REFLECTION SURFACE
(45° INCLINED SURFACE)

35

ORIGINAL SENSING DEVICE AND SENSING DEVICE

BACKGROUND OF THE INVENTION

1. Field of the Invention

The present invention relates to a sensing device and, more particularly, to a sensing device for accurately sensing the presence/absence of a target object by a sensor. The present invention further relates to an original sensing device and, more particularly, to an original sensing device in a copying machine with an automatic document feeder, which accurately senses the presence/absence of originals placed on an original tray when each of the originals stacked on the original tray is moved to a copying machine main body and image information on the original is read.

2. Related Background Art

FIG. 1 is a schematic view showing the main parts of a copying machine as an image forming apparatus having an automatic document feeder with a conventional original sensing device. General functions and operations of the automatic document feeder will be described below with reference to FIG. 1.

First, a sensor (original sensing device) 103 senses the presence/absence of originals 204 stacked on an original tray 101 of the document. feeder. An output signal from this sensor 103 is input to a copying machine 104. When an operator operates a copy start switch (not shown) of the copying machine 104, paper feed rollers 105, 106, and 107 and a paper feed belt 108 rotate in the direction of an arrow in FIG. 1. A stop blade 109 for preventing multiple sheet feeding separates the lowermost one of the originals 204 and feeds this original 204 to the upper left portion in FIG. 1. The fed original 204 is conveyed onto an original glass table 122 by the rotation of an original conveyor roller 111, as a conveyor means which has started rotating in the direction shown by an arrow by the copy start operation, and by the rotation of a press roller 110 and an original conveyor belt 120 which rotate in accordance with the rotation of the original conveyor roller 111. When the original 204 is set in a predetermined position on the original glass table 122, the rotation of the original conveyor belt 120 is stopped. Rollers 121 behind the original conveyor belt 120 press the original 204 with appropriate pressure against the original glass table 122, and the copying machine 104 (details of its optical system are not shown) starts reading an image. When the exposure is complete, the copying machine 104 generates a signal to rotate the original conveyor belt 120 and rollers 141, 142, and 143 and deliver the original 204 subjected to the image reading onto the original tray 101.

FIG. 2 is a schematic view showing the major parts of the conventional original sensing device. FIG. 3 is a schematic view showing the main components of a projector shown in FIG. 3.

Referring to FIG. 2, a projector 211 has, e.g., a light-emitting diode (LED) as a light source. A light-shielding window member 201 has openings 205 and 206. A transparent dust cover 202 is placed on this light-shielding window member 201. Portions 203 on this dust cover 202 are part of an original tray case. The originals 204 are placed on the original tray 101. A photodetector 212 has a sensor (photosensor). A printed board 213 fixes the projector 211 and the photodetector 212.

Referring to FIG. 3, a light-emitting chip 11 of the LED is usually encapsulated with a transparent resin. A ring-like reflector 12 is placed near this light-emitting chip 11. When electrodes 15 supply electric power, the whole light-emitting chip 11 emits light, and the reflector 12 reflects a portion of the emitted light beam toward a portion above the light-emitting chip 11. Since a dome-like lens 14 is placed above the light-emitting chip 11, the light beam entering this lens 14 slightly decreases the diffusion angle when emerging from the lens 14 and further points upward as a light beam 16 shown in FIG. 3. On the other hand, light beams entering a cylindrical portion 13, rather than the lens 14, are largely refracted because the angle of incidence to the cylindrical portion 13 is large. Consequently, these light beams obliquely point upward as light beams 17 shown in FIG. 3.

Referring to FIG. 2, of the light beams emitted upward from the projector 211, those passing through the opening 205 in the light-shielding window member 201 illuminate the surface of the original 204 through the transparent dust filter 202. A curve A in FIG. 4 indicates the light amount distribution in the illuminated portion on the surface of the original 204. The illuminating light amount is largest immediately above the light source. Of the light beams reflected by the surface of the original 204, those transmitted through the dust filter 202 and passing through the opening 206 in the light-shielding window member 201 irradiate the photoelectric surface through a resin lens 21 in the upper portion of the photodetector 212. A curve B in FIG. 4 indicates the sensitivity distribution on the surface of the original 204 obtained by the photodetector 212. The sensitivity is highest immediately above the photodetector 212.

When the original 204 is placed on the original tray 101 in the above arrangement, light beams from the projector 211 illuminate the surface of the original 204 as indicated by the curves A and B in FIG. 4. Of reflected light beams from the illuminated portion of the original 204, those passing through the opening 206 in the light-shielding window member 201 irradiate the photodetector 212. These light beams are photoelectrically converted by the photodetector 212 and converted into an electrical signal by an electronic circuit (not shown). When the original 204 does not exist on the original tray 101, no reflected light beams are produced, so neither light beams irradiate the photodetector 212, nor electrical signal is generated. With this arrangement, the presence/absence of the original 204 on the original tray 101 can be converted into an electrical signal.

In this conventional device, as shown in FIG. 4, a portion where the amount of illuminating light from the light source (projector) is largest is different from a portion where the sensitivity of light detection by the photodetector is highest. Therefore, the amount of light entering the photodetector is small even when an original exists on the original tray. To overcome this drawback, one of following means (1), (2), and (3) is conventionally used.

(1) Increase the light emission amount of the light source of the projector to increase the amount of illuminating light to an original.

(2) Raise the sensitivity of the photodetector.

(3) Make the illuminating light amount largest and the sensitivity highest in close positions or in the same position.

Unfortunately, these means have the following problems.

Means (1) requires an expensive light source because a high-output light source is necessary.

Means (2) is readily influenced by external light such as a ceiling illuminating lamp because the sensitivity of the photodetector is raised. Accordingly, light beams sometimes enter the sensor although no original exists on the original tray, and a detection error occurs in some cases.

Means (3) will be described in detail below.

(A) The light source and the sensor can also be inclined with respect to the original tray surface (original surface). If this is the case, however, the light source and the sensor can no longer be fixed on the same plane of one printed board. The use of a plurality of printed boards requires a connector and results in an expensive device. Also, assembly of these parts into the device requires much labor and increases the assembly cost.

(B) FIGS. 5 and 6 show a conventional device when the countermeasure according to means (3) above is practiced. Referring to FIGS. 5 and 6, a condenser lens 221 has a convex section. In FIG. 5, light beams from the light-emitting chip of the LED of the projector 211 are fed into the left-hand side, in FIG. 5, of the condenser lens 211 and bent to the right toward a portion above the photodetector 212, thereby illuminating the original 204. The reflected light beams from the original 204 are passed through the right-hand side, in FIG. 5, of the condenser lens 221 so that these light beams enter the photodetector 212, thereby causing the light beams to point toward the sensor. This makes the position where the light beams from the projector 211 irradiate the original 204 the came as the position on the surface of the original 204 where the sensitivity of the photodetector 212 is highest. Consequently, the sensing efficiency increases.

Means (3) described above, however, has the following problems.

(C) An upper surface 221a of the condenser lens 221 reflects some light beams from the projector 211. Especially when light beams transmitted through the cylindrical portion 13 of the projector 211 enter the upper portion of the condenser lens 221, a slightly generated reflected light beam points in the direction of the photodetector 212 as shown in FIG. 6 and enters the photodetector 212 regardless of the presence/absence of the original 204. To eliminate this reflected light beam, a more expensive countermeasure is necessary, e.g., an antireflection coating must be formed on the upper surface 221a of the condenser lens 221.

(D) As shown in FIG. 7, slight paper dust particles falling from the original 204 are deposited on the dust filter 202 with the lapse of time. This intercepts the detecting optical path to lower the sensitivity or causes a detection error if reflected light beams from paper dust particles are detected as the existence of the original 204. Even after a serviceman cleans the dust filter 202, paper dust articles sometimes remain in corners and move from the corners to the middle of the optical path due to vibrations when the lower copying apparatus operates and thereby cause a detection error.

SUMMARY OF THE INVENTION

It is an object of the present invention to provide a small sensing device capable of using a light source having a simple arrangement (low cost) by raising the sensitivity of a sensor by arranging an optical member having an appropriate shape between a projecting/photodetecting unit and a target object and thereby increasing the overlap of a projecting optical path and a photodetecting optical path on the object. Also, the present invention follows the aforementioned gist and has as its another object to provide an original sensing device having good characteristics when the target object is an original.

An original sensing device of the present invention is an original sensing device for sensing the presence/absence of an original placed on an original tray of a document feeder by using an output signal from a photodetector which receives a light beam emitted by a light projector and reflected by the original tray side, characterized by comprising a projecting/photodetecting unit including the light projector and the photodetector, the light projector and the photodetector being arranged to oppose the original tray such that a projecting optical axis and a photodetecting optical axis are substantially parallel to each other, and an optical member interposed between the projecting/photodetecting unit and the original tray, wherein boundary surfaces of the optical member are constructed such that a portion of a light beam on the projecting optical axis emerges toward a direction of the original tray via at least two boundary surfaces, a reflected light beam from the original tray side is guided to the photodetector via at least two boundary surfaces, and other part of the light beam on the projecting optical axis does not emerge toward the direction of the original tray but is reflected by a boundary surface disposed at the tray side to face the original tray and is caused to be totally reflected by a boundary surface disposed at the photodetector side to face the photodetector.

The device is characterized in that the optical member has a flange in a peripheral portion closer to the projecting/photodetecting unit than the boundary surface facing the original tray.

The device is characterized in that the optical member is made of a material having visible light transmittance lower than infrared light transmittance.

The device is characterized in that the optical member comprises a prism having a total reflection surface inclining 45° with respect to the projecting optical axis.

The device is characterized in that at least a portion of the boundary surface of the optical member, which faces the original tray, inclines with respect to a surface of the original tray.

The device is characterized in that the boundary surface of the optical member, which faces the original tray, is a curved surface.

The device is characterized in that the optical member comprises a prism.

The device is characterized in that the optical member is formed by integrating a prism and a condenser lens.

The device is characterized in that the light projector comprises an infrared-emitting diode.

The device is characterized in that the light projector and the photodetector are fixed to one flat printed board.

The device is characterized in that a light-shielding plate is inserted between the light projector and the photodetector.

Another original sensing device of the present invention is an original sensing device for sensing the presence/absence of an original placed on an original tray of a document feeder by using an output signal from a photodetector which receives a light beam emitted by a light projector and reflected by the original tray (original surface), characterized by comprising a projecting/photodetecting unit including the light projector and the photodetector, the light projector and the photodetector being arranged to oppose the original tray such that a projecting optical axis and a photodetecting optical axis are substantially parallel to each other, and a prism interposed between the projecting/photodetecting unit and the original tray, wherein the prism has a first boundary surface for receiving a light beam on the projecting optical axis, a second boundary surface from which the incident light beam from the first boundary surface emerges toward a direction of the original tray, a third boundary surface for receiving a reflected light beam from the original tray, and a fourth boundary surface from which the incident light beam from the third boundary surface emerges toward the photodetector, and the boundary surfaces are constructed such that the fourth boundary surface totally reflects a light beam which is part of the incident light beam from the first boundary surface and does not emerge toward the direction of the original tray but is reflected by the second boundary surface.

The device is characterized in that the prism has a flange in a peripheral portion closer to the projecting/photodetecting unit than a boundary surface facing the original tray.

The device is characterized in that the prism is made of a material having visible light transmittance lower than infrared light transmittance.

The device is characterized in that the prism has a total reflection surface inclining 45° with respect to the projecting optical axis.

The device is characterized in that the second boundary surface of the prism inclines with respect to a surface of the original tray.

The device is characterized in that the light projector comprises an infrared-emitting diode.

The device is characterized in that the light projector and the photodetector are fixed to one flat printed board.

The device is characterized in that a light-shielding plate is inserted between the light projector and the photodetector.

Still another original sensing device of the present invention is an original sensing device for sensing the presence/absence of an original placed on an original tray of a document feeder by using an output signal from a photodetector which receives a light beam emitted by a light projector and reflected by the original tray, characterized by comprising a projecting/photodetecting unit including the light projector and the photodetector, the light projector and the photodetector being arranged to oppose the original tray such that a projecting optical axis and a photodetecting optical axis are substantially parallel to each other, and a prism interposed between the projecting/photodetecting unit and the original tray, wherein the prism has a first boundary surface for receiving a light beam on the projecting optical axis, a second boundary surface from which the incident light beam from the first boundary surface emerges toward a direction of the original tray (original surface), a third boundary surface flush with the second boundary surface to receive a reflected light beam from the original tray, a fourth boundary surface from which the incident light beam from the third boundary surface emerges toward the photodetector, and a fifth boundary surface adjacent to the fourth boundary surface and perpendicular to a surface of the original tray, and the boundary surfaces are constructed such that the fourth and fifth boundary surfaces totally reflect a light beam which is part of the incident light beam from the first boundary surface and does not emerge toward the direction of the original tray but is reflected by the second boundary surface, and the third boundary surface totally reflects a light beam which is part of the incident light beam from the first boundary surface and is caused to be directed in a direction of not the second boundary surface but the third boundary surface.

The device is characterized in that the prism has a flange in a peripheral portion closer to the projecting/photodetecting unit than a boundary surface facing the original tray.

The device is characterized in that the prism is made of a material having visible light transmittance lower than infrared light transmittance.

The device is characterized in that the prism has a total reflection surface inclining 45° with respect to the projecting optical axis.

The device is characterized in that the second and third boundary surfaces having the same plane of the prism inclines with respect to the surface of the original tray.

The device is characterized in that the light projector comprises an infrared-emitting diode.

The device is characterized in that the light projector and the photodetector are fixed to one flat printed board.

The device is characterized in that a light-shielding plate is inserted between the light projector and the photodetector.

The device is characterized in that a recess is formed in a portion of a circumference of the second and third boundary surfaces flush with each other on the prism.

Still another original sensing device of the present invention is an original sensing device for sensing the presence/absence of an original placed on an original tray of a document feeder by using an output signal from a photodetector which receives a light beam emitted by a light projector and reflected by the original tray, characterized by comprising a projecting/photodetecting unit including the light projector and the photodetector, the light projector and the photodetector being arranged to oppose the original tray such that a projecting optical axis and a photodetecting optical axis are substantially parallel to each other, and an optical member formed by integrating a prism and a condenser lens and interposed between the projecting/photodetecting unit and the original tray, wherein the optical member has a first boundary surface for receiving a light beam on the projecting optical axis, a second boundary surface from which the incident light beam from the first boundary surface emerges toward a direction of the original tray, a third boundary surface flush with the second boundary surface to receive a reflected light beam from the original tray, a fourth boundary surface from which the incident light beam from the third boundary surface emerges toward the photodetector, and a fifth boundary surface adjacent to the fourth boundary surface and perpendicular to a surface of the original tray, and the boundary surfaces are constructed such that the fourth and fifth boundary surfaces totally reflect a light beam which is part of the incident light beam from the first boundary surface and does not emerge toward the direction of the original tray but reflected by the second boundary surface.

The device is characterized in that the optical member has a flange in a peripheral portion closer to the projecting/photodetecting unit than a boundary surface facing the original tray.

The device is characterized in that the prism is made of a material having visible light transmittance lower than infrared light transmittance.

The device is characterized in that the optical member comprises a prism having a total reflection surface inclining 45° with respect to the projecting optical axis.

The device is characterized in that the second and third boundary surfaces flush with each other on the prism have a convex surface facing the original tray.

The device is characterized in that the light projector comprises an infrared-emitting diode.

The device is characterized in that the light projector and the photodetector are fixed to one flat printed board.

The device is characterized in that a light-shielding plate is inserted between the light projector and the photodetector.

A sensing device of the present invention is a sensing device for sensing the presence/absence of a target object by using an output signal from a photodetector which receives a light beam emitted by a light projector and reflected by the object, characterized by comprising a projecting/photodetecting unit including the light projector and the photodetector, the light projector and the photodetector being arranged to oppose the object such that a projecting optical axis and a photodetecting optical axis are substantially parallel to each other, and an optical member interposed between the projecting/photodetecting unit and the object, wherein boundary surfaces of the optical member are constructed such that a portion of a light beam on the projecting optical axis emerges toward a direction of the object at least two boundary surfaces, a reflected light beam from the object is guided to the photodetector via at least two boundary surfaces, and other part of the light beam on the projecting optical axis does not emerge toward the direction of the object but is reflected by a boundary surface facing the object and is totally reflected by a boundary surface facing the photodetector.

The device is characterized in that the optical member has a flange in a peripheral portion closer to the projecting/photodetecting unit than the boundary surface facing the object.

The device is characterized in that the optical member is made of a material having visible light transmittance lower than infrared light transmittance.

The device is characterized in that the optical member comprises a prism having a total reflection surface inclining 45° with respect to the projecting optical axis.

The device is characterized in that at least a portion of the boundary surface of the optical member, which faces the object, inclines with respect to a surface of the object.

The device is characterized in that the boundary surface of the optical member, which faces the object, is a curved surface.

The device is characterized in that the optical member comprises a prism.

The device is characterized in that the optical member is formed by integrating a prism and a condenser lens.

The device is characterized in that the light projector comprises an infrared-emitting diode.

The device is characterized in that the light projector and the photodetector are fixed to one flat printed board.

The device is characterized in that a light-shielding plate is inserted between the light projector and the photodetector.

Another sensing device of the present invention is a sensing device for sensing the presence/absence of a target object by using an output signal from a photodetector which receives a light beam emitted by a light projector and reflected by the object, characterized by comprising a projecting/photodetecting unit including the light projector and the photodetector, the light projector and the photodetector being arranged to oppose the object such that a projecting optical axis and a photodetecting optical axis are substantially parallel to each other, and a prism interposed between the projecting/photodetecting unit and the object, wherein the prism has a first boundary surface for receiving a light beam on the projecting optical axis, a second boundary surface from which the incident light beam from the first boundary surface emerges toward a direction of the object, a third boundary surface for receiving a reflected light beam from the object, and a fourth boundary surface from which the incident light beam from the third boundary surface emerges toward the photodetector, and the boundary surfaces are constructed such that the fourth boundary surface totally reflects a light beam which is part of the incident light beam from the first boundary surface and does not emerge toward the direction of the object but is reflected by the second boundary surface.

The device is characterized in that the prism has a flange in a peripheral portion closer to the projecting/photodetecting unit than a boundary surface facing the object.

The device is characterized in that the prism is made of a material having visible light transmittance lower than infrared light transmittance.

The device is characterized in that the prism has a total reflection surface inclining 45° with respect to the projecting optical axis.

The device is characterized in that the second boundary surface of the prism inclines with respect to a surface of the object.

The device is characterized in that the light projector comprises an infrared-emitting diode.

The device is characterized in that the light projector and the photodetector are fixed to one flat printed board.

The device is characterized in that a light-shielding plate is inserted between the light projector and the photodetector.

Still another sensing device of the present invention is a sensing device for sensing the presence/absence of a target object by using an output signal from a photodetector which receives a light beam emitted by a light projector and reflected by the object, characterized by comprising a projecting/photodetecting unit including the light projector and the photodetector, the light projector and the photodetector being arranged to oppose the object such that a projecting optical axis and a photodetecting optical axis are substantially parallel to each other, and a prism interposed between the projecting/photodetecting unit and the object, wherein the prism has a first boundary surface for receiving a light beam on the projecting optical axis, a second boundary surface from which the incident light beam from the first boundary surface emerges toward a direction of the object, a third boundary surface flush with the second boundary surface to receive a reflected light beam from the object, a fourth boundary surface from which the incident light beam from the third boundary surface emerges toward the photodetector, and a fifth boundary surface adjacent to the fourth boundary surface and perpendicular to a surface of the object, and the boundary surfaces are constructed such that the fourth and fifth boundary surfaces totally reflect a light beam which is part of the incident light beam from the first boundary surface and does not emerge toward the direction of the object but is reflected by the second boundary surface, and the third boundary surface totally reflects a light beam which is part of the incident light beam from the first boundary surface and is directed toward a direction of not the second boundary surface but the third boundary surface.

The device is characterized in that the prism has a flange in a peripheral portion closer to the projecting/photodetecting unit than a boundary surface facing the object.

The device is characterized in that the prism is made of a material having visible light transmittance lower than infrared light transmittance.

The device is characterized in that the prism has total reflection surface inclining 45° with respect to the projecting optical axis.

The device is characterized in that the second and third boundary surfaces flush with each other on the prism inclines with respect to the surface of the object.

The device is characterized in that the light projector comprises an infrared-emitting diode.

The device is characterized in that the light projector and the photodetector are fixed to one flat printed board.

The device is characterized in that a light-shielding plate is inserted between the light projector and the photodetector.

The device is characterized in that a recess is formed in a portion of a circumference of the second and third boundary surfaces flush with each other on the prism.

Still another sensing device of the present invention is a sensing device for sensing the presence/absence of a target object by using an output signal from a photodetector which receives a light beam emitted by a light projector and reflected by the object, characterized by comprising a projecting/photodetecting unit including the light projector and the photodetector, the light projector and the photodetector being arranged to oppose the object such that a projecting optical axis and a photodetecting optical axis are substantially parallel to each other, and an optical member formed by integrating a prism and a condenser lens and interposed between the projecting/photodetecting unit and the object, wherein the optical member has a first boundary surface for receiving a light beam on the projecting optical axis, a second boundary surface from which the incident light beam from the first boundary surface emerge toward a direction of the object, a third boundary surface flush with the second boundary surface to receive a reflected light beam from the object, a fourth boundary surface from which the incident light beam from the third boundary surface emerges towards the photodetector, and a fifth boundary surface adjacent to the fourth boundary surface and perpendicular to a surface of the object, and the boundary surfaces are constructed such that the fourth and fifth boundary surfaces totally reflect a light beam which is part of the incident light beam from the first boundary surface and does not emerge toward the direction of the object but is reflected by the second boundary surface.

The device is characterized in that the optical member has a flange in a peripheral portion closer to the projecting/photodetecting unit than a boundary surface facing the object.

The device is characterized in that the prism is made of a material having visible light transmittance lower than infrared light transmittance.

The device is characterized in that the optical member comprises a prism having a total reflection surface inclining 45° with respect to the projecting optical axis.

The device is characterized in that the second and third boundary surfaces flush with each other on the prism have a convex surface facing the object.

The device is characterized in that the light projector comprises an infrared-emitting diode.

The device is characterized in that the light projector and the photodetector are fixed to one flat printed board.

The device is characterized in that a light-shielding plate is inserted between the light projector and the photodetector.

DETAILED DESCRIPTION OF THE PREFERRED EMBODIMENTS

Figure 1:
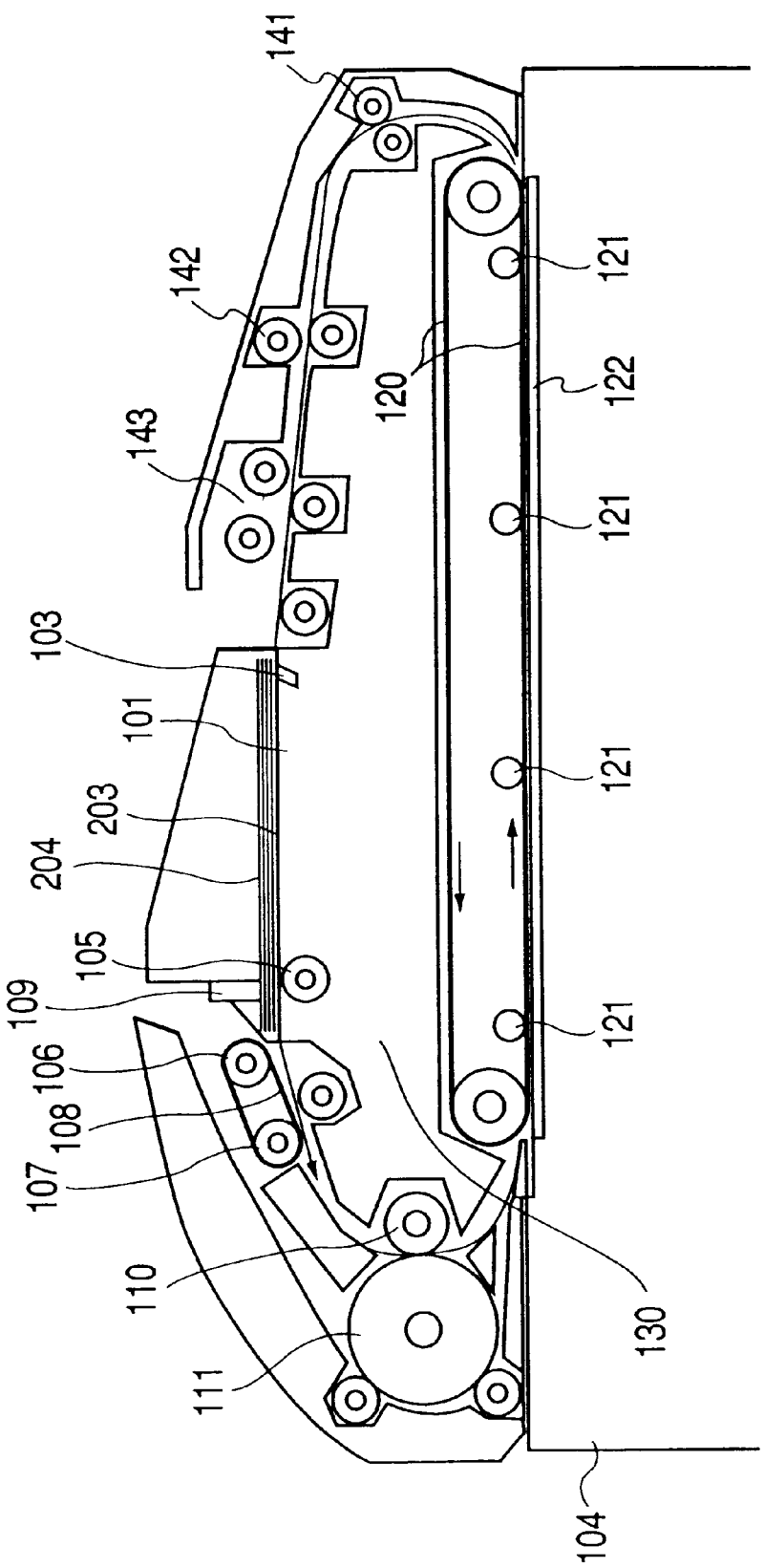
FIG. 1 is a schematic view showing the main parts of a conventional copying machine main body.
Figure 2:
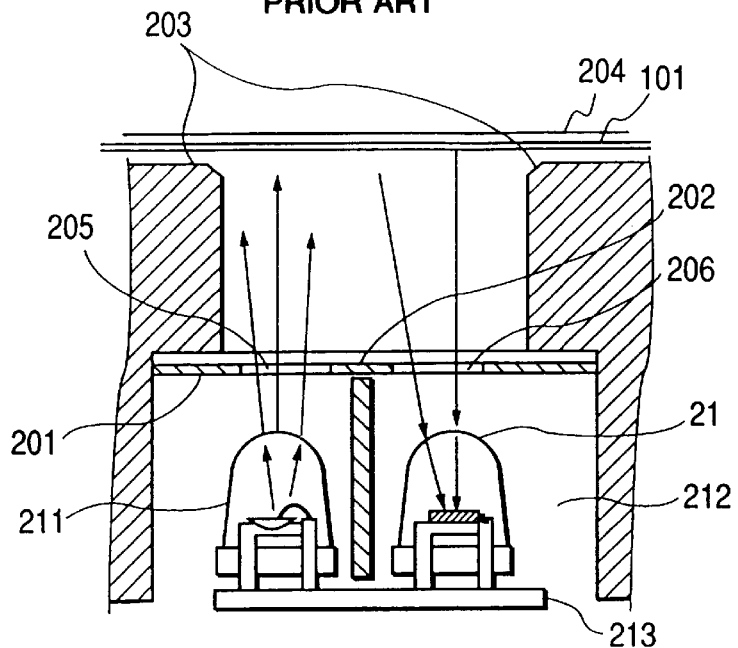
FIG. 2 is a schematic view showing the main parts of a conventional original sensing device.
Figure 3:
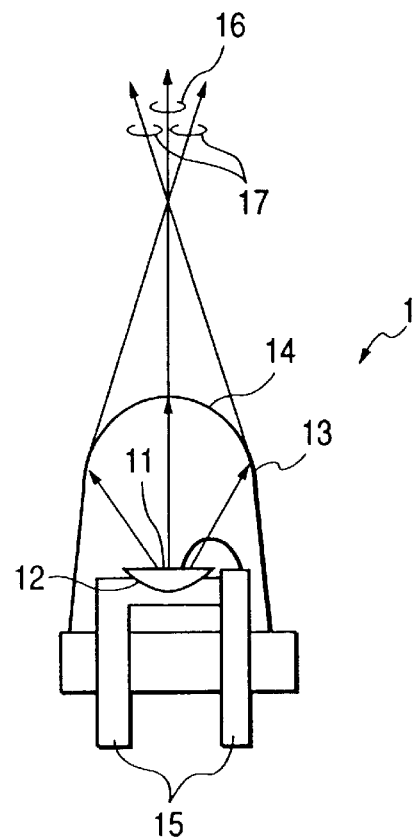
FIG. 3 is a schematic view showing the major components of the conventional original sensing device.
Figure 4:
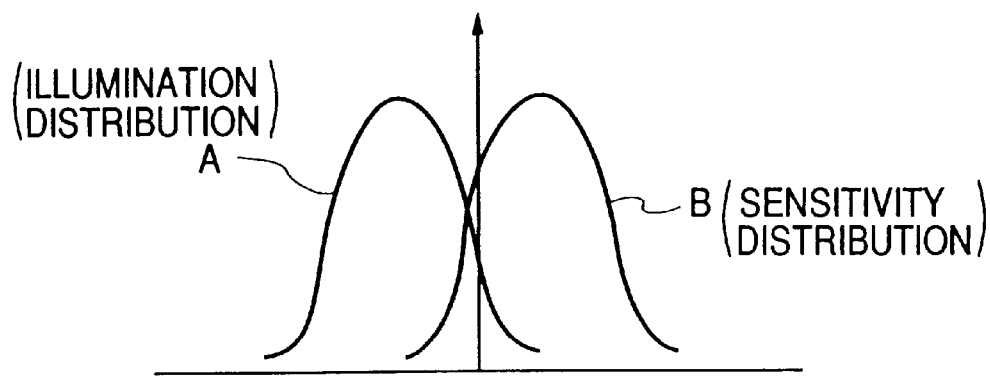
FIG. 4 is a graph for explaining the illumination distribution and the sensitivity distribution on the original surface.
Figure 5:
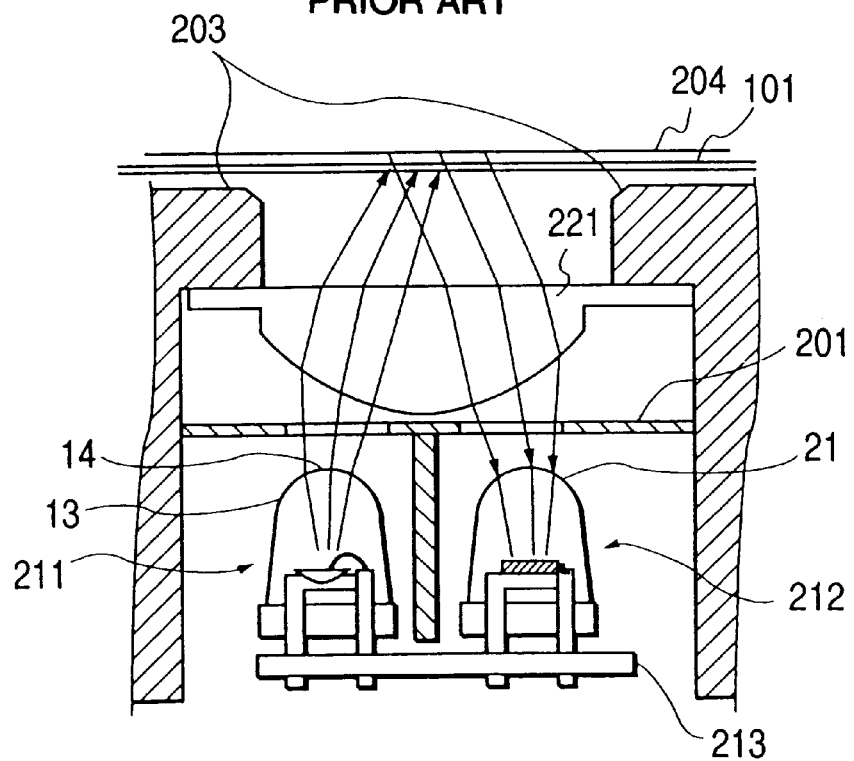
FIG. 5 is a schematic view showing the main components of a conventional original sensing device.
Figure 6:
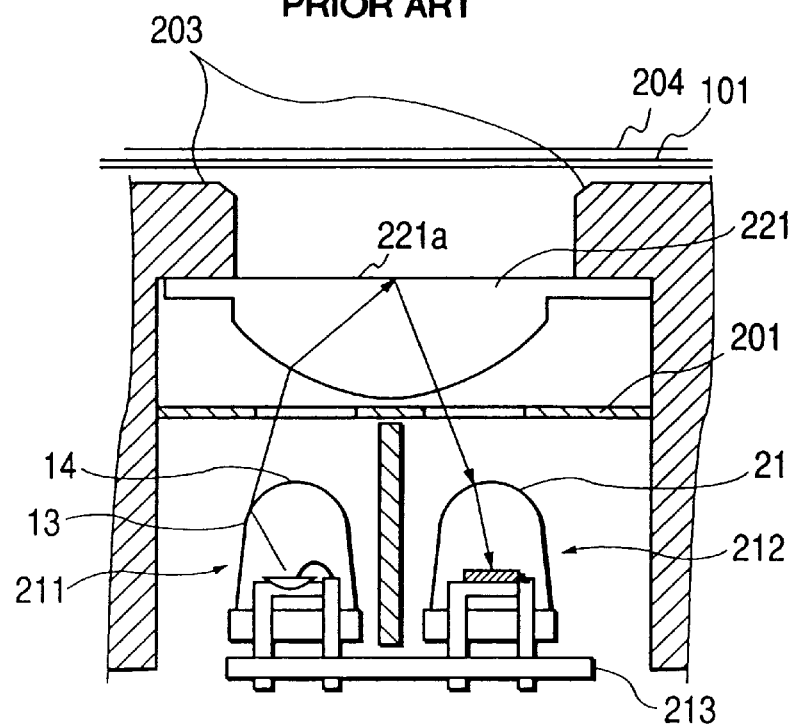
FIG. 6 is a schematic view showing the main parts of the conventional original sensing device.
Figure 7:
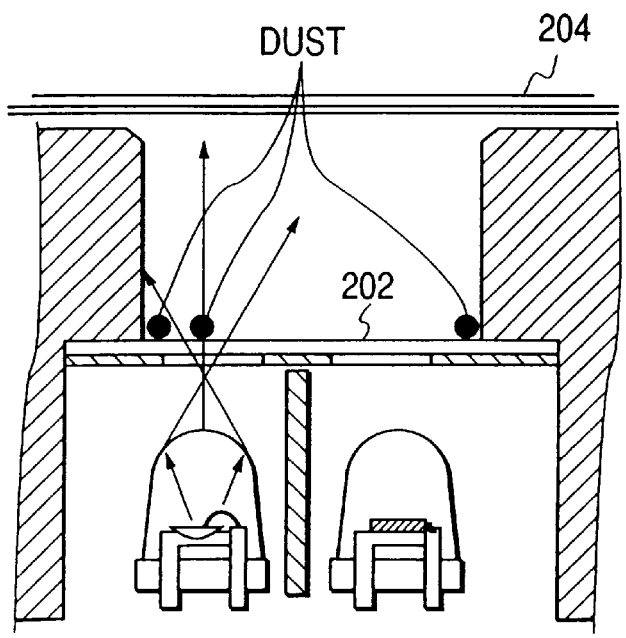
FIG. 7 is a schematic view showing the major parts of a conventional original sensing device.
Figure 8:
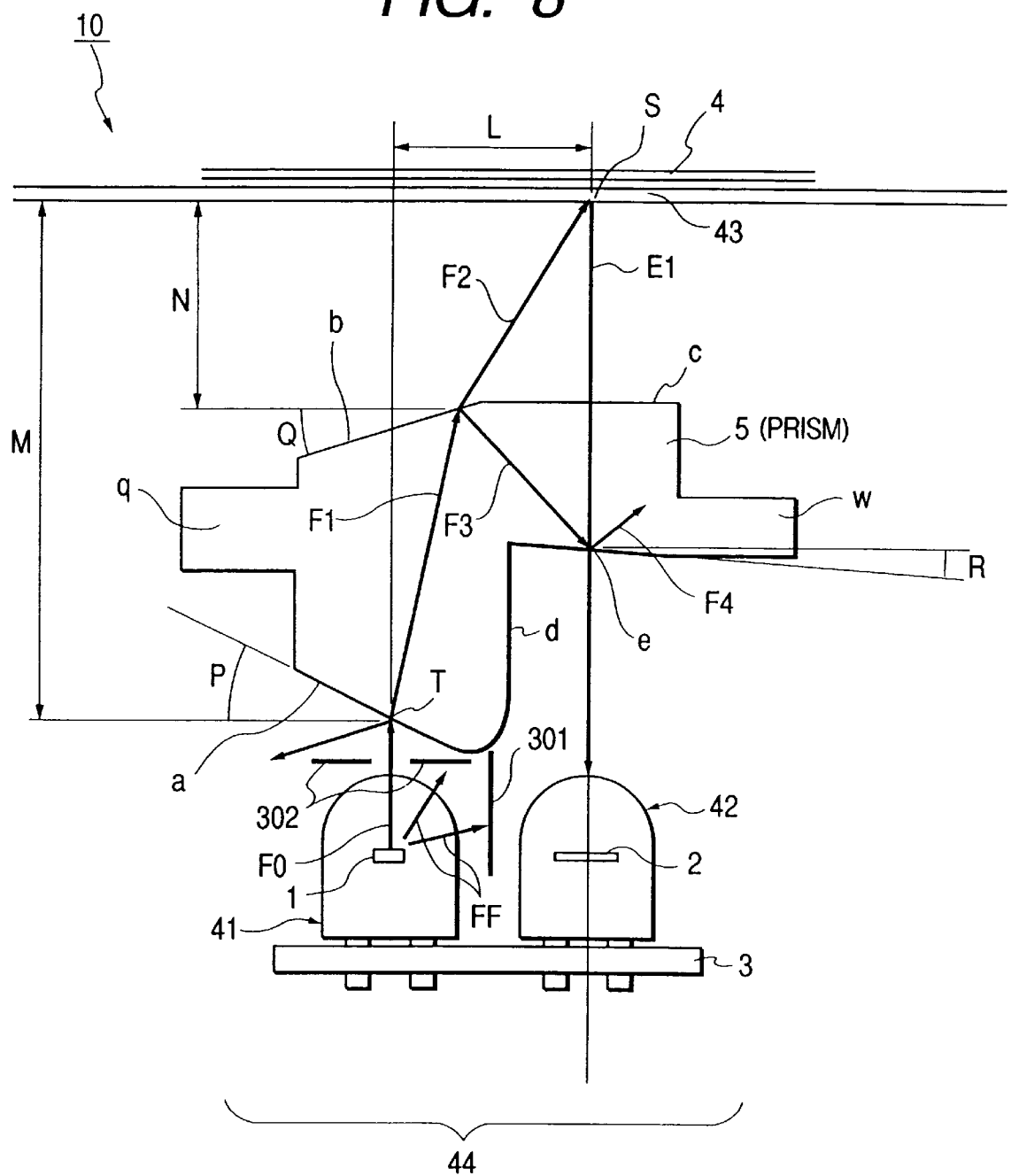
FIG. 8 is a schematic view showing the main parts of the first embodiment of the present invention.
Figure 9:
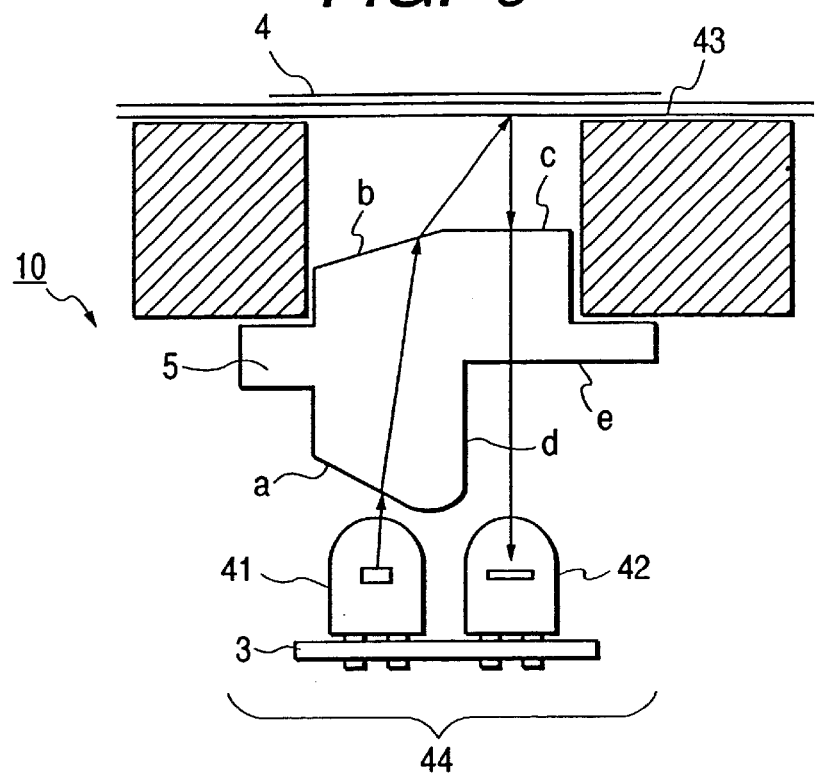
FIG. 9 is a schematic view showing the main parts of the first embodiment of the present invention.

FIGS. 8 and 9 are schematic views showing the major parts of the first embodiment of the present invention. That is, FIGS. 8 and 9 show part of an image forming apparatus as shown in FIG. 1.

Referring to FIGS. 8 and 9, an original (paper) 4 is placed on an original tray 43 of a document feeder. An original sensing device 10 includes a light projector 41 having a light source constructed of an infrared-emitting diode (IRED) 1, a photodetector 42 having a photosensor (sensor) 2, and a prism 5 (to be described later). This original sensing device 10 opposes the original tray 43 (in a position below the original 4). The light projector 41 and the photodetector 42 are so arranged that the projecting optical axis (the axis in the emitting direction of a light beam emitted by the light projector 41) and the photodetecting optical axis (the axis of the directivity of the photodetector 42) are substantially parallel to each other. The light projector 41 and the photodetector 42 are fixed to a flat printed board 3. Also, the light projector 41 and the photodetector 42 are contained in a projecting/photodetecting unit 44.

The prism 5 as an optical member is interposed between the projecting/photodetecting unit 44 and the original tray 43. The prism 5 of this embodiment has a first boundary surface a for receiving a light beam on the projecting optical axis, a second boundary surface b from which the light beam incident from the first boundary surface a emerges toward the direction of the original tray 43, a third boundary surface c for receiving the reflected light beam from the original tray 43, and a fourth boundary surface e from which the light beam incident from the third boundary surface c emerges toward the photodetector 42. These boundary surfaces are so constructed (arranged) that the fourth boundary surface e totally reflects a light beam which is part of the light beam which is incident on the first boundary surface a, and is not emergent toward the direction of the original tray 43 but is reflected by the second boundary surface b.

The second boundary surface b inclines with respect to the surface of the original tray 43 (the surface of the original 4). Referring to FIG. 8, the left end portion of this second boundary surface b is lower than its right end portion. Flanges q and w to be fixed to the casing of the document feeder are formed in a peripheral portion of the prism 5 closer to the projecting/photodetecting unit 44 than the second and third boundary surfaces b and c facing the original tray 43. These flanges q and w are fixed to the casing by an adhesive or the like.

A light-shielding plate 301 is inserted between the light projector 41 and the photodetector 42. This light-shielding plate 301 prevents a light beam emitted by the light projector 41 from entering the photodetector 42 without passing through the prism 5. An aperture stop 302 limits the light beam (light amount) emitted by the light projector 41.

In this embodiment, the diameter of the infrared-emitting diode 1 is about 3 mm, the diameter of the sensor 2 is about 3 mm, a distance L from the infrared-emitting diode 1 to the sensor 2 is about 8 mm, the distance from the printed board 3 to which the infrared-emitting diode 1 is fixed to the surface of the original tray 43 is about 30 mm, an inclination angle P of the first boundary surface a of the prism 5 with respect to a plane parallel to the surface of the original tray 43 is 28.79°, an inclination angle Q of the second boundary surface b is 17.86°, the inclination angle of the third boundary surface c is substantially 0°, an inclination angle R of the fourth boundary surface e is substantially 0°, the material of the prism 5 is a polycarbonate resin, and the refractive index at an infrared wavelength is about 1.57.

In this embodiment, a light beam F0 (a light beam on the projecting optical axis) emitted by a light-emitting chip of the infrared-emitting diode (IRED) 1 and passing through a lens central portion of the IRED 1 is directed upward in FIG. 8 and is incident on the prism 5 from the first boundary surface a. Light beams FF emitted by portions other than the lens central portion of the IRED 1 are intercepted by the member stop 301 or the light-shielding plate 302. A light-beam F1 incident (transmitted) through the first boundary surface a of the prism 5 is refracted at an angle of 17.860 in accordance with the Snell laws of refraction represented by $$\sin^{-1}((\sin 28.79)/1.57)=17.86$$

and obliquely emerges at an angle of about 10.926° from the second boundary surface b toward the upper right portion of FIG. 8 as light beam F2. That is, the light beam F1 refracted in a position T at a distance M from the surface of the original tray 43 by the first boundary surface a exits from the second boundary surface b and irradiates the original tray 43 (original surface). A partial light beam F3 not emerging from but reflected by the second boundary surface b is incident on the fourth boundary surface e. Since the inclination angle R of the fourth boundary surface e with respect to the surface of the original tray 43 (the surface of the original 4) is substantially 0°, the incident angle of the light beam F3 incident on the fourth boundary surface e is 46.653° which exceeds the total reflection angle calculated by the Snell laws of refraction. Accordingly, this light beam F3 is not transmitted through but totally reflected as a light beam F4 by the fourth boundary surface e and hence is not directed toward the photodetector 42.

The light beam F4 reflected by the fourth boundary surface e is repetitively reflected by the inner surfaces of the prism 5 and more or less emerges from any surface. However, the optical path length becomes very long before this light beam F4 points in the direction of the photodetector 42. Also, the light amount of the light beam F4 reduces to be unsensible due to attenuation by the transmittance of the polycarbonate resin. So, this light beam F4 suffers no problem.

When the original 4 is placed on the original tray 43, a light beam El reflected at an irradiation position S of the original 4 enters the prism 5 from the third boundary surface c, exits from the fourth boundary surface e, and irradiates the photodetector 42. When the original 4 is not set on the original tray 43, no reflected light beam is generated, so no light beam irradiates the photodetector 42. With this arrangement, the sensor 2 can accurately sense the presence/absence of the original 4 on the original tray 43.

In this embodiment, the second boundary surface b at the top (on the original tray side) of the prism 5 inclines, as described above, with respect to the surface of the original tray 43 (the surface of the original 4) such that the left end is lowest in FIG. 8. Therefore, dust particles falling from the upper portion move to this left end portion by fine vibrations of the apparatus and easily accumulate in this portion. This prevents easy accumulation of dust particles near the optical path of the second boundary surface b in the upper portion of the prism 5 and thereby makes this optical path difficult to intercept.

In this embodiment as described above, the prism 5 having an appropriate shape is interposed between the projecting/photodetecting unit 44 and the original tray 43. This increases the overlap of the projecting optical path (the optical path for illuminating an original) and the photodetecting optical path (the optical path for sensing the reflected light beam from an original) and thereby raises the sensitivity of the sensor 2. Accordingly, a light source having a simple arrangement (low cost) can be used. Also, in this embodiment the second boundary surface b inclines with respect to the surface of the original tray 43. So, it is possible to prevent the generation of stray light resulting from the accumulation of dust particles on the upper surface of the prism 5. Furthermore, the surfaces of the prism 5 can be easily cleaned because the opening to these surfaces is wide.

Figure 10:
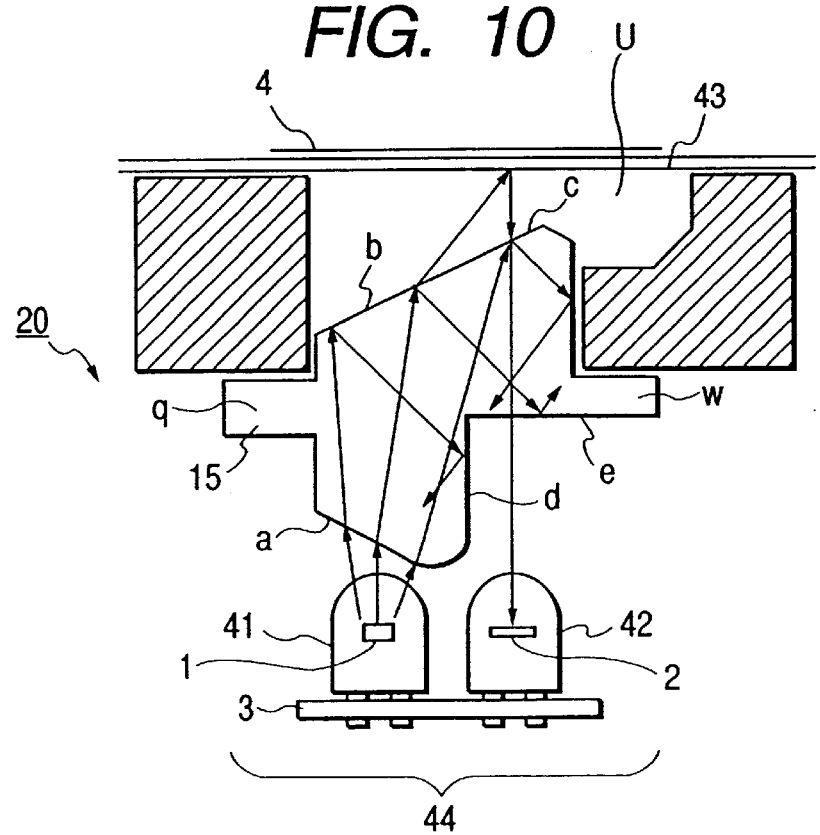
FIG. 10 is a schematic view showing the major components of the second embodiment of the present invention.

FIG. 10 is a schematic view showing the main components of the second embodiment of the present invention. In FIG. 10, the same reference numerals as used in FIG. 8 denote the same elements.

This second embodiment differs from the above first embodiment in the shape of a prism interposed between a projecting/photodetecting unit and an original tray. The rest of the arrangement and the optical function are substantially the same as in the first embodiment, and similar effects are obtained.

In this embodiment, a prism 15 is interposed between a projecting/photodetecting unit 44 and an original tray 43 as in the first embodiment. This prism 15 has a first boundary surface a for receiving a light beam on the projecting optical path, a second boundary surface b from which the light beam incident from the first boundary surface a emerges toward the direction of the original tray 43, a third boundary surface c flush with the second boundary surface b to receive the reflected light beam from the original tray 43, a fourth boundary surface e from which the light beam incident from the third boundary surface c emerges toward a photodetector 42, and a fifth boundary surface d adjacent to the fourth boundary surface e and perpendicular to the surface of the original tray 43. These boundary surfaces are so constructed (arranged) that the fourth and fifth boundary surfaces e and d totally reflect a light beam which is part of the light beam which is incident from the first boundary surface a and does not emerge toward the direction of the original tray 43 but is reflected by the second boundary surface b, and that the third boundary surface c totally reflects a light beam which is part of the light beam incident on the first boundary surface a and is not directed toward the second boundary surface b but is directed toward the third boundary surface c.

In this embodiment, the second and third boundary surfaces b and c formed at the top (on the original tray side) of the prism 5 and flush with each other incline with respect to the surface of the original tray 43 such that the left end is lowest in FIG. 10. Therefore, dust particles falling from the upper portion move to this left end portion by fine vibrations of the apparatus and easily accumulate in this portion. This prevents easy accumulation of dust particles near the optical paths of the second and third boundary surfaces b and c in the upper portion of the prism 15 and thereby makes these optical paths difficult to intercept.

Additionally, a recess (paper dust receiver) U is formed in a portion around the second and third boundary surfaces b and c flush with each other on the prism 15. This recess U allows accumulation of dust particles falling from the upper portion.

In this embodiment as described above, the prism 15 having an appropriate shape is interposed between the projecting/photodetecting unit 44 and the original tray 43. As in the first embodiment, therefore, it is possible to raise the sensitivity of the sensor 2 and prevent the generation of stray light caused by the accumulation of dust particles on the upper surface of the prism 15 without generating any stray light. Also, the surfaces of the prism 15 can be easily cleaned because the access opening to these surfaces is wide.

Figure 11:
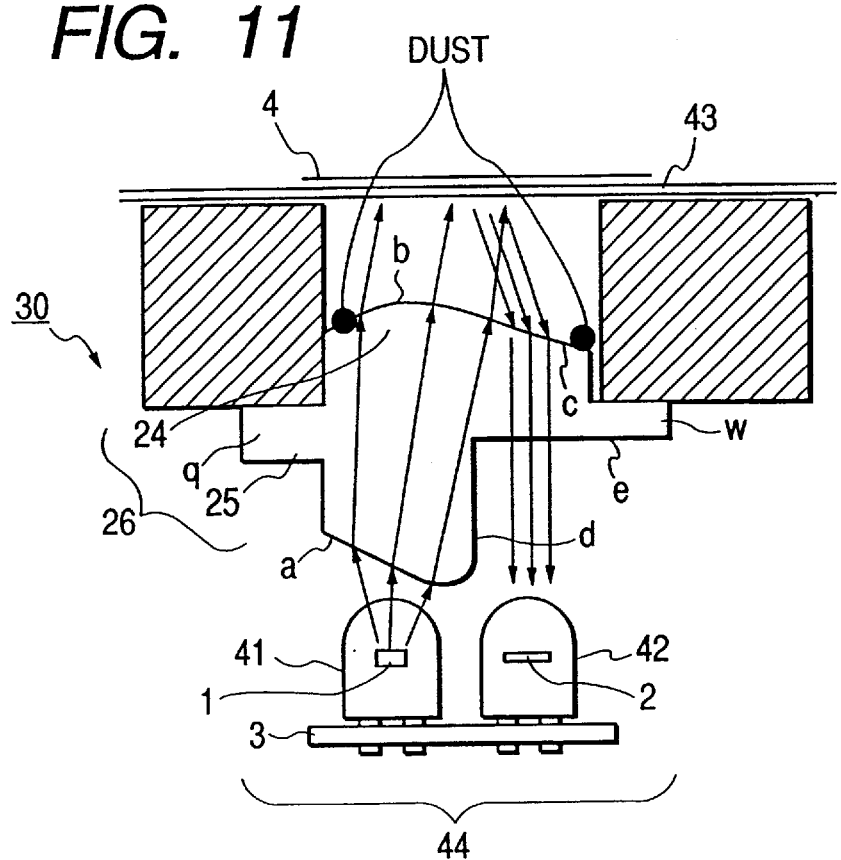
FIG. 11 is a schematic view showing the main components of the third embodiment of the present invention.
Figure 12:
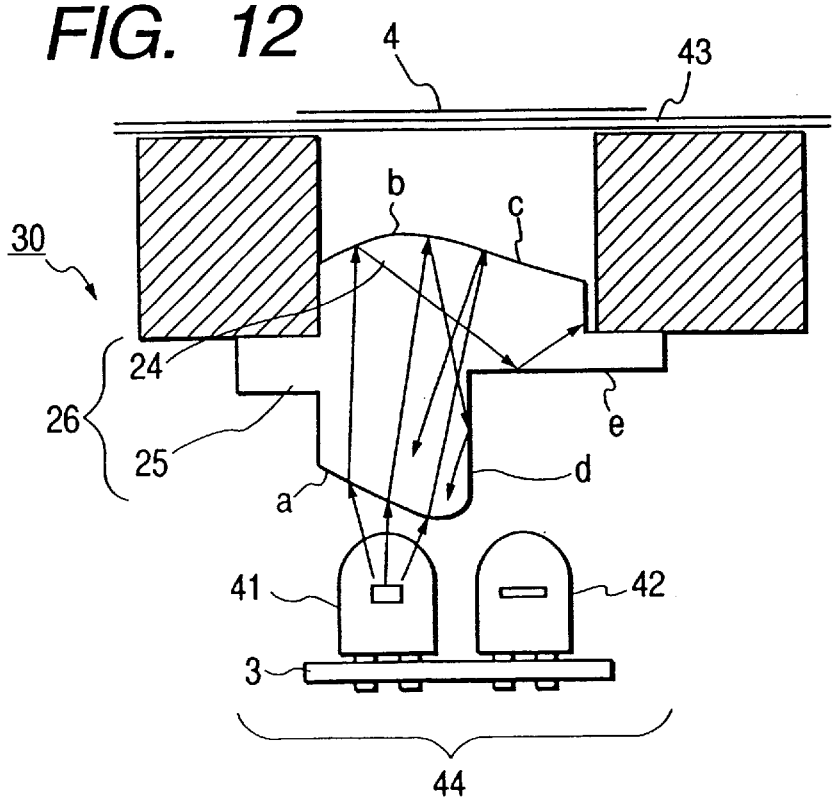
FIG. 12 is a schematic view showing the main components of the third embodiment of the present invention.

FIGS. 11 and 12 are schematic views showing the major components of the third embodiment of the present invention. In FIGS. 11 and 12, the same reference numerals as in FIG. 8 denote the same elements.

This embodiment differs from the above first embodiment in the construction and shape of an optical member interposed between a projecting/photodetecting unit and an original tray. The rest of the arrangement and the optical function are substantially the same as in the first embodiment, and similar effects are obtained.

In this embodiment, an optical member 26 formed by integrating a prism 25 and a condenser lens 24 having a convex section is interposed between a projecting/photodetecting unit 44 and an original tray 43. This optical member 26 has a first boundary surface a for receiving a light beam on the projecting optical axis, a second boundary surface b from which the light beam incident from the first boundary surface a emerges toward the original tray 43, a third boundary surface c flush with the second boundary surface b to receive the reflected light beam from the original tray 43, a fourth boundary surface e from which the light beam incident from the third boundary surface c emerges toward a photodetector 42, and a fifth boundary surface d adjacent to the fourth boundary surface e and perpendicular to the surface of the original tray 43. These boundary surfaces are so constructed (arranged) that the fourth and fifth boundary surfaces e and d totally reflect a light beam which is part of the light beam incident from the first boundary surface a and does not emerge toward the original tray 43 but is reflected by the second boundary surface b.

In this embodiment, the second and third boundary surfaces b and c formed at the top (on the original tray side) of the optical member 26 and flush with each other form a convex surface facing the original tray 43. Therefore, dust particles falling from the upper portion move to the two end portions by fine vibrations of the apparatus and easily accumulate in these portions. This prevents easy accumulation of dust particles near the optical paths of the second and third boundary surfaces b and c in the upper portion of the optical member 26 and thereby makes these optical paths difficult to intercept.

In this embodiment as described above, the optical member formed by integrating the prism 25 and the condenser lens 24 is interposed between the projecting/photodetecting unit 44 and the original tray 43. Therefore, substantially the same effects as in the first embodiment are obtained. Also, the ratio of condensation of a light beam irradiating the surface of an original 4 increases, and this increases the light amount. Accordingly, a light source having low consumption power and a simple arrangement (low cost) can be used.

In each of the above embodiments, the prism can also be made of a resin whose visible light transmittance is lower than its infrared light transmittance. With this arrangement, visible light from a ceiling light is absorbed by this material of the prism and hence does not reach the detecting unit. This increases the amount of infrared light as a signal from the light source. Consequently, the sensitivity of the sensor can be increased as a whole.

Figure 13:
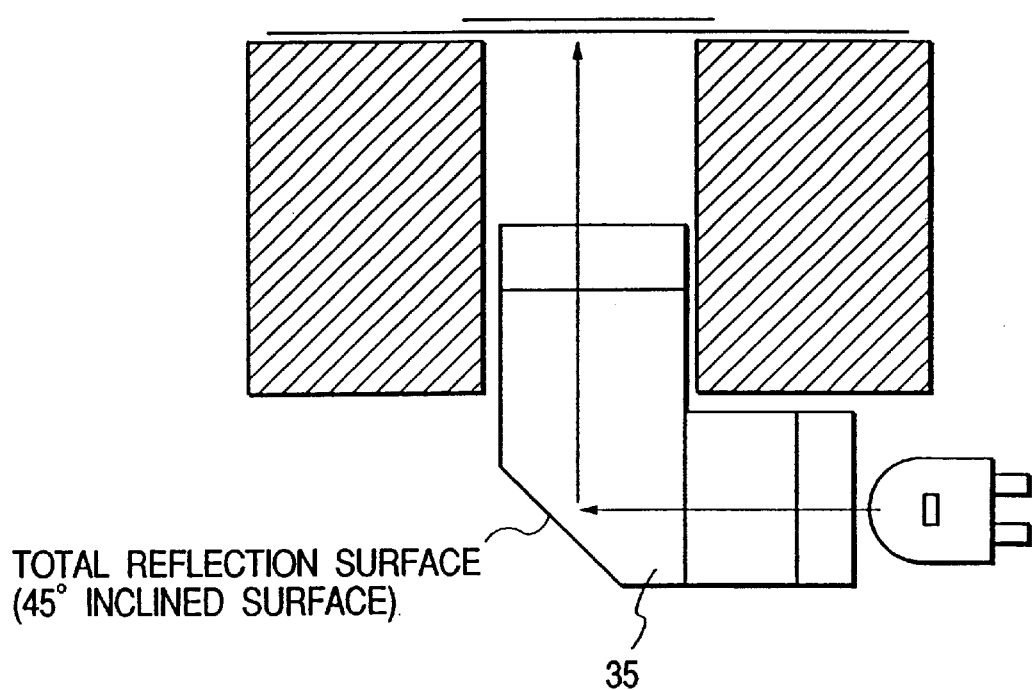
FIG. 13 is a schematic view showing the major parts when a 45° total reflection prism is used.

In each of the above embodiments, as shown in FIG. 13, the optical member can also be constructed by a prism having a total reflection surface which inclines 45° with respect to the projecting optical axis. With this prism, it is possible to increase the optical path length and decrease the dimension in the direction of depth of the sensor.

In each of the above embodiments, the optical member can take any arbitrary shape as long as the aforementioned conditions are met.

In each of the above embodiments, an original sensing device for sensing an original is explained. However, the present invention is not necessarily limited to an original sensing device. That is, the present invention is also effective as a sensing device for sensing the presence/absence of another target object.

In the present invention as described above, by properly constructing the constituent elements of an original sensing device, it is possible to raise the sensitivity of a sensor by increasing the overlap of the projecting optical path and the photodetecting optical path on the original surface and thereby achieve a small original sensing device capable of using a light source having a simple arrangement (low cost).

Especially in the first and second embodiments, by properly designing the shape of the prism interposed between the projecting/photodetecting unit and the original tray, it is possible to increase the sensitivity of the sensor and prevent the generation of stray light caused by accumulation of dust particles on the upper surface of the prism without generating any stray light. Also, the prism surfaces can be easily cleansed because the access opening to these surfaces is wide.

In the third embodiment, the ratio of condensation of a light beam irradiating the original surface increases, and this increases the light amount. Accordingly, a light source having low power (consumption and a simple arrangement (low cost) can be used.

In each of the above embodiments, when the prism is made of a resin whose visible light transmittance is lower than its infrared light transmittance, visible light from a ceiling light is absorbed by this material of the prism and hence does not reach the photodetector. This increases the amount of infrared light as a signal from the light source. Consequently, the sensitivity of the sensor can be increased as a whole.

In each of the above embodiments, when the optical member is constructed by a prism having a total reflection surface which inclines 45° with respect to the projecting optical axis, it is possible to increase the optical path length and decrease the dimension in the direction of depth of the sensor.

The present invention is not necessarily restricted to an original sensing device. For example, the present invention is also effective as a sensing device for sensing the presence/absence of another target object, and substantially the same effects as the original sensing device described above can be obtained.

What is claimed is:

1. An original sensing device for sensing the presence/absence of an original placed on an original tray of a document feeder by using an output signal from a photodetector which receives a light beam emitted by a light projector and reflected by said original tray, comprising:
   a projecting/photodetecting unit including said light projector and said photodetector, said light projector and said photodetector being arranged to oppose said original tray such that a projecting optical axis and a photodetecting optical axis are substantially parallel to each other; and
   an optical member interposed between said projecting/photodetecting unit and said original tray,
   wherein boundary surfaces of said optical member are constructed such that a portion of a light beam on the projecting optical axis emerges toward a direction of said original tray via at least two boundary surfaces, a reflected light beam from said original tray is guided to said photodetector via at least two boundary surfaces, and other part of the light beam on the projecting optical axis does not emerge toward the direction of said original tray but is reflected by a boundary surface facing said original tray and is totally reflected by a boundary surface facing said photodetector.

2. A device according to claim 1, wherein said optical member has a flange in a peripheral portion loser to said projecting/photodetecting unit than the boundary surface facing said original tray.

3. A device according to claim 1, wherein said optical member is made of a material having visible light transmittance lower than infrared light transmittance.

4. A device according to claim 1, wherein said optical member comprises a prism having a total reflection surface inclining 45° with respect to the projecting optical axis.

5. A device according to claim 1, wherein at least a portion of the boundary surface of said optical member, which faces said original tray, inclines with respect to a surface of said original tray.

6. A device according to claim 1, wherein the boundary surface of said optical member, which faces said original tray, is a curved surface.

7. A device according to claim 1, wherein said optical member comprises a prism.

8. A device according to claim 1, wherein said optical member is formed by integrating a prism and a condenser lens.

9. A device according to claim 1, wherein said light projector comprises an infrared-emitting diode.

10. A device according to claim 1, wherein said light projector and said photodetector are fixed to one flat printed board.

11. A device according to claim 1, wherein a light-shielding plate is inserted between said light projector and said photodetector.

12. An original sensing device for sensing the presence/absence of an original placed on an original tray of a document feeder by using an output signal from a photodetector which receives a light beam emitted by a light projector and reflected by said original tray, comprising:
   a projecting/photodetecting unit including said light projector and said photodetector, said light projector and said photodetector being arranged to oppose said original tray such that a projecting optical axis and a photodetecting optical axis are substantially parallel to each other; and
   a prism interposed between said projecting/photodetecting unit and said original tray,
   wherein said prism has a first boundary surface for receiving a light beam on the projecting optical axis, a second boundary surface from which the incident light beam from the first boundary surface emerges toward a direction of said original tray, a third boundary surface for receiving a reflected light beam from said original tray, and a fourth boundary surface from which the incident light beam from the third boundary surface emerges toward said photodetector, and
   the boundary surfaces are constructed such that the fourth boundary surface totally reflects a light beam which is part of the incident light beam from the first boundary surface and does not emerge toward the direction of said original tray but is reflected by the second boundary surface.

13. A device according to claim 12, wherein said prism has a flange in a peripheral portion closer to said projecting/photodetecting unit than a boundary surface facing said original tray.

14. A device according to claim 12, wherein said prism is made of a material having visible light transmittance lower than infrared light transmittance.

15. A device according to claim 12, wherein said prism has a total reflection surface inclining 45° with respect to the projecting optical axis.

16. A device according to claim 12, wherein the second boundary surface of said prism inclines with respect to a surface of said original tray.

17. A device according to claim 12, wherein said light projector comprises an infrared-emitting diode.

18. A device according to claim 12, wherein said light projector and said photodetector are fixed to one flat printed board.

19. A device according to claim 12, wherein a light-shielding plate is inserted between said light projector and said photodetector.

20. An original sensing device for sensing the presence/absence of an original placed on an original tray of a document feeder by using an output signal from a photodetector which receives a light beam emitted by a light projector and reflected by said original tray, comprising:
   a projecting/photodetecting unit including said light projector and said photodetector, said light projector and said photodetector being arranged to oppose said original tray such that a projecting optical axis and a photodetecting optical axis are substantially parallel to each other; and
   a prism interposed between said projecting/photodetecting unit and said original tray,
   wherein said prism has a first boundary surface for receiving a light beam on the projecting optical axis, a second boundary surface from which the incident light beam from the first boundary surface emerges toward a direction of said original tray, a third boundary surface flush with the second boundary surface to receive a reflected light beam from said original tray, a fourth boundary surface from which the incident light beam from the third boundary surface emerges toward said photodetector, and a fifth boundary surface adjacent to the fourth boundary surface and perpendicular to a surface of said original tray, and the boundary surfaces are constructed such that the fourth and fifth boundary surfaces totally reflect a light beam which is part of the incident light beam from the first boundary surface and does not emerge toward the direction of said original tray but is reflected by the second boundary surface, and the third boundary surface totally reflects a light beam which is part of the incident light beam from the first boundary surface and is directed in a direction of not the second boundary surface but the third boundary surface.

21. A device according to claim 20, wherein said prism has a flange in a peripheral portion closer to said projecting/photodetecting unit than a boundary surface facing said original tray.

22. A device according to claim 20, wherein said prism is made of a material having visible light transmittance lower than infrared light transmittance.

23. A device according to claim 20, wherein said prism has a total reflection surface inclining 45° with respect to the projecting optical axis.

24. A device according to claim 20, wherein the second and third boundary surfaces having the same plane of said prism incline with respect to the surface of said original tray.

25. A device according to claim 20, wherein said light projector comprises an infrared-emitting diode.

26. A device according to claim 20, wherein said light projector and said photodetector are fixed to one flat printed board.

27. A device according to claim 20, wherein a light-shielding plate is inserted between said light projector and said photodetector.

28. A device according to claim 20, wherein a recess is formed in a portion of a circumference of the second and third boundary surfaces flush with each other on said prism.

29. An original sensing device for sensing the presence/absence of an original placed on an original tray of a document feeder by using an output signal from a photodetector which receives a light beam emitted by a light projector and reflected by said original tray, comprising:
a projecting/photodetecting unit including said light projector and said photodetector, said light projector and said photodetector being arranged to oppose said original tray such that a projecting optical axis and a photodetecting optical axis are substantially parallel to each other; and
an optical member formed by integrating a prism and a condenser lens and interposed between said projecting/photodetecting unit and said original tray,
wherein said optical member has a first boundary surface for receiving a light beam on the projecting optical axis, a second boundary surface from which the incident light beam from the first boundary surface emerges toward a direction of said original tray, a third boundary surface flush with the second boundary surface to receive a reflected light beam from said original tray, a fourth boundary surface from which the incident light beam from the third boundary surface emerges toward said photodetector, and a fifth boundary surface adjacent to the fourth boundary surface and perpendicular to a surface of said original tray, and
the boundary surfaces are constructed such that the fourth and fifth boundary surfaces totally reflect a light beam which is part of the incident light beam from the first boundary surface and does not emerge toward the direction of said original tray but is reflected by the second boundary surface.

30. A device according to claim 29, wherein said optical member has a flange in a peripheral portion closer to said projecting/photodetecting unit than a boundary surface facing said original tray.

31. A device according to claim 29, wherein said prism is made of a material having visible light transmittance lower than infrared light transmittance.

32. A device according to claim 29, wherein said optical member comprises a prism having a total reflection surface inclining 45° with respect to the projecting optical axis.

33. A device according to claim 29, wherein the second and third boundary surfaces flush with each other on said prism have a convex surface facing said original tray.

34. A device according to claim 29, wherein said light projector comprises an infrared-emitting diode.

35. A device according to claim 29, wherein said light projector and said photodetector are fixed to one flat printed board.

36. A device according to claim 29, wherein a light-shielding plate is inserted between said light projector and said photodetector.

37. A sensing device for sensing the presence/absence of a target object by using an output signal from a photodetector which receives a light beam emitted by a light projector and reflected by the object, comprising:
a projecting/photodetecting unit including said light projector and said photodetector, said light projector and said photodetector being arranged to oppose the object such that a projecting optical axis and a photodetecting optical axis are substantially parallel to each other; and
an optical member interposed between said projecting/photodetecting unit and the object,
wherein boundary surfaces of said optical member are constructed such that a portion of a light beam on the projecting optical axis emerges toward a direction of the object via at least two boundary surfaces, a reflected light beam from the object is guided to said photodetector via at least two boundary surfaces, and other part of the light beam on the projecting optical axis does not emerge toward the direction of the object but is reflected by a boundary surface facing the object and is totally reflected by a boundary surface facing said photodetector.

38. A device according to claim 37, wherein said optical member has a flange in a peripheral portion closer to said projecting/photodetecting unit than the boundary surface facing the object.

39. A device according to claim 37, wherein said optical member is made of a material having visible light transmittance lower than infrared light transmittance.

40. A device according to claim 37, wherein said optical member comprises a prism having a total reflection surface inclining 45° with respect to the projecting optical axis.

41. A device according to claim 37, wherein at least a portion of the boundary surface of said optical member, which faces the object, inclines with respect to a surface of the object.

42. A device according to claim 37, wherein the boundary surface of said optical member, which faces the object, is a curved surface.

43. A device according to claim 37, wherein said optical member comprises a prism.

44. A device according to claim 37, wherein said optical member is formed by integrating a prism and a condenser lens.

45. A device according to claim 37, wherein said light projector comprises an infrared-emitting diode.

46. A device according to claim 37, wherein said light projector and said photodetector are fixed to one flat printed board.

47. A device according to claim 37, wherein a light-shielding plate is inserted between said light projector and said photodetector.

48. A sensing device for sensing the presence/absence of a target object by using an output signal from a photodetector which receives a light beam emitted by a light projector and reflected by the object, comprising:

a projecting/photodetecting unit including said light projector and said photodetector, said light projector and said photodetector being arranged to oppose the object such that a projecting optical axis and a photodetecting optical axis are substantially parallel to each other; and a prism interposed between said projecting/photodetecting unit and the object, wherein said prism has a first boundary surface for receiving a light beam on the projecting optical axis, a second boundary surface from which the incident light beam from the first boundary surface emerges toward a direction of the object, a third boundary surface for receiving a reflected light beam from the object, and a fourth boundary surface from which the incident light beam from the third boundary surface emerges toward said photodetector, and the boundary surfaces are constructed such that the fourth boundary surface totally reflects a light beam which is part of the incident light beam from the first boundary surface and does not emerge toward the direction of the object but is reflected by the second boundary surface.

49. A device according to claim 48, wherein said prism has a flange in a peripheral portion closer to said projecting/photodetecting unit than a boundary surface facing the object.

50. A device according to claim 48, wherein said prism is made of a material having visible light transmittance lower than infrared light transmittance.

51. A device according to claim 48, wherein said prism has a total reflection surface inclining 45° with respect to the projecting optical axis.

52. A device according to claim 48, wherein the second boundary surface of said prism inclines with respect to a surface of the object.

53. A device according to claim 48, wherein said light projector comprises an infrared-emitting diode.

54. A device according to claim 48, wherein said light projector and said photodetector are fixed to one flat printed board.

55. A device according to claim 48, wherein a light-shielding plate is inserted between said light projector and said photodetector.

56. A sensing device for sensing the presence/absence of a target object by using an output signal from a photodetector which receives a light beam emitted by a light projector and reflected by the object, comprising:

a projecting/photodetecting unit including said light projector and said photodetector, said light projector and said photodetector being arranged to oppose the object such that a projecting optical axis and a photodetecting optical axis are substantially parallel to each other; and a prism interposed between said projecting/photodetecting unit and the object, wherein said prism has a first boundary surface for receiving a light beam on the projecting optical axis, a second boundary surface from which the incident light beam from the first boundary surface emerges toward a direction of the object, a third boundary surface flush with the second boundary surface to receive a reflected light beam from the object, a fourth boundary surface from which the incident light beam from the third boundary surface emerges toward said photodetector, and a fifth boundary surface adjacent to the fourth boundary surface and perpendicular to a surface of the object, and the boundary surfaces are constructed such that the fourth and fifth boundary surfaces totally reflect a light beam which is part of the incident light beam from the first boundary surface and does not emerge toward the direction of the object but is reflected by the second boundary surface, and the third boundary surface totally reflects a light beam which is part of the incident light beam from the first boundary surface and is directed in a direction of not the second boundary surface but the third boundary surface.

57. A device according to claim 56, wherein said prism has a flange in a peripheral portion closer to said projecting/photodetecting unit than a boundary surface facing the object.

58. A device according to claim 56, wherein said prism is made of a material having visible light transmittance lower than infrared light transmittance.

59. A device according to claim 56, wherein said prism has a total reflection surface inclining 45° with respect to the projecting optical axis.

60. A device according to claim 56, wherein the second and third boundary surfaces flush with each other on said prism inclines with respect to the surface of the object.

61. A device according to claim 56, wherein said light projector comprises an infrared-emitting diode.

62. A device according to claim 56, wherein said light projector and said photodetector are fixed to one flat printed board.

63. A device according to claim 56, wherein a light-shielding plate is inserted between said light projector and said photodetector.

64. A device according to claim 56, wherein a recess is formed in a portion of a circumference of the second and third boundary surfaces flush with each other on said prism.

65. A sensing device for sensing the presence/absence of a target object by using an output signal from a photodetector which receives a light beam emitted by a light projector and reflected by the object, comprising:

a projecting/photodetecting unit including said light projector and said photodetector, said light projector and said photodetector being arranged to oppose the object such that a projecting optical axis and a photodetecting optical axis are substantially parallel to each other; and an optical member formed by integrating a prism and a condenser lens and interposed between said projecting/photodetecting unit and the object, wherein said optical member has a first boundary surface for receiving a light beam on the projecting optical axis, a second boundary surface from which the incident light beam from the first boundary surface emerges toward a direction of the object, a third boundary surface flush with the second boundary surface to receive a reflected light beam from the object, a fourth boundary surface from which the incident light beam from the third boundary surface emerges toward said photodetector, and a fifth boundary surface adjacent to the fourth boundary surface and perpendicular to a surface of the object, and the boundary surfaces are constructed such that the fourth and fifth boundary surfaces totally reflect a light beam which is part of the incident light beam from the first boundary surface and does not emerge toward the direction of the object but is reflected by the second boundary surface.

66. A device according to claim 65, wherein said optical member has a flange in a peripheral portion closer to said projecting/photodetecting unit than a boundary surface facing the object.

67. A device according to claim 65, wherein said prism is made of a material having visible light transmittance lower than infrared light transmittance.

68. A device according to claim 65, wherein said optical member comprises a prism having a total reflection surface inclining 45° with respect to the projecting optical axis.

69. A device according to claim 65, wherein the second and third boundary surfaces flush with each other on said prism have a convex surface facing the object.

70. A device according to claim 65, wherein said light projector comprises an infrared-emitting diode.

71. A device according to claim 65, wherein said light projector and said photodetector are fixed to one flat printed board.

72. A device according to claim 65, wherein a light-shielding plate is inserted between said light projector and said photodetector.

* * * * *

UNITED STATES PATENT AND TRADEMARK OFFICE
CERTIFICATE OF CORRECTION

PATENT NO.   : 6,246,859 B1
DATED        : June 12, 2001
INVENTOR(S)  : Yukio Takemura et al.

Page 1 of 1

It is certified that error appears in the above-identified patent and that said Letters Patent is hereby corrected as shown below:

Column 3,
Line 23, "came" should read -- same --.
Line 46, "articles" should read -- particles --.

Column 7,
Line 13, "object" should read -- object via --.

Column 8,
Line 61, "total" should read -- a total --.
Line 67, "inclines" should read -- incline --.

Column 11,
Line 35, "17.860" should read -- 17.86° --.

Column 14,
Line 50, "(consumption" should read -- consumption --.

Column 15,
Line 31, "loser" should read -- closer --.

Signed and Sealed this

Twenty-sixth Day of February, 2002

Attest:

JAMES E. ROGAN
*Attesting Officer*     *Director of the United States Patent and Trademark Office*